United States Patent
Tai et al.

(10) Patent No.: US 11,101,766 B2
(45) Date of Patent: Aug. 24, 2021

(54) WIPER DEVICE

(71) Applicant: MITSUBA Corporation, Gunma (JP)

(72) Inventors: Takashi Tai, Gunma (JP); Hisashi Azami, Gunma (JP)

(73) Assignee: MITSUBA Corporation, Gunma (JP)

( * ) Notice: Subject to any disclaimer, the term of this patent is extended or adjusted under 35 U.S.C. 154(b) by 29 days.

(21) Appl. No.: 16/642,381

(22) PCT Filed: Jul. 25, 2018

(86) PCT No.: PCT/JP2018/027804
§ 371 (c)(1),
(2) Date: Feb. 27, 2020

(87) PCT Pub. No.: WO2019/044287
PCT Pub. Date: Mar. 7, 2019

(65) Prior Publication Data
US 2020/0350849 A1    Nov. 5, 2020

(30) Foreign Application Priority Data
Aug. 31, 2017  (JP) .............................. JP2017-166588

(51) Int. Cl.
*H02P 29/66* (2016.01)
*H02P 6/15* (2016.01)
*B60S 1/08* (2006.01)

(52) U.S. Cl.
CPC .............. *H02P 29/662* (2016.11); *B60S 1/08* (2013.01); *H02P 6/153* (2016.02)

(58) Field of Classification Search
CPC ........... H02P 29/662; H02P 6/153; B60S 1/08
See application file for complete search history.

(56) References Cited

U.S. PATENT DOCUMENTS

2015/0082575 A1*  3/2015  Kimura ..................... H02P 6/08
                                                                    15/250.12
2016/0322921 A1* 11/2016  Annaka ................... B60S 1/166

FOREIGN PATENT DOCUMENTS

JP    2008238899    10/2008
JP    2008312298    12/2008
(Continued)

OTHER PUBLICATIONS

"Search Report of Europe Counterpart Application", dated Mar. 24, 2021, p. 1-p. 7.

(Continued)

*Primary Examiner* — Zoheb S Imtiaz
(74) *Attorney, Agent, or Firm* — 502620

(57) ABSTRACT

A wiper device is provided. A boost control unit, if a duty ratio has reached an upper limit value determined in advance, and if the rotational speed of a motor is less than a target rotational speed, varies an advance angle and an energization angle associated with the energization of the motor in accordance with the target rotational speed. An overtemperature protection unit monitors a load state of the motor, and, upon detecting a high-load state, performs a first protection control for decreasing the rotational speed of the motor. A demagnetization protection unit, upon receipt of an operating signal from a wiper switch when the temperature detected by means of a temperature sensor exceeds a first threshold and the first protection control is being performed, performs a second protection control for fixing the advance angle and energization angle of the motor by prohibiting the operation of the boost control unit.

4 Claims, 15 Drawing Sheets

(56) References Cited

FOREIGN PATENT DOCUMENTS

| | | |
|---|---|---|
| JP | 2014195389 | 10/2014 |
| JP | 2016007975 | 1/2016 |

OTHER PUBLICATIONS

"International Search Report (Form PCT/ISA/210) of PCT/JP2018/027804," dated Oct. 30, 2018, with English translation thereof, pp. 1-4.

* cited by examiner

WIPER DEVICE

CROSS-REFERENCE TO RELATED APPLICATION

This application is a 371 application of the international PCT application serial no. PCT/JP2018/027804, filed on Jul. 25, 2018, which claims the priority benefit of Japan application no. 2017-166588, filed on Aug. 31, 2017. The entirety of each of the abovementioned patent applications is hereby incorporated by reference herein and made a part of this specification.

BACKGROUND

Technical Field

The present invention relates to a wiper device which drives to swing a wiper member that wipes off substances adhered to a windshield.

Background Art

Conventionally, a wiper device for wiping rainwater, dust, and the like attached to a windshield is mounted on a vehicle such as an automobile. The wiper device includes a wiper member which swings on the windshield, and a motor for causing the wiper member to swing. When an operator turns on a wiper switch provided in a vehicle interior, a motor is driven to rotate, and in response to this, the wiper member performs a reciprocating wiping operation on the windshield to wipe off the substances.

As a technique of such a wiper device, for example, a wiper device disclosed in Patent Literature 1 is known. When a wiping mode is a high-speed mode, the wiper device supplies a current to an armature coil at an energizing timing at which an advance angle and an energizing angle thereof are larger than those in a low-speed mode. Thus, field-weakening control for making a rotating magnetic field weaker than that in the low-speed mode can be performed, so that a rotation speed and a torque of a rotor can be increased.

CITATION LIST

Patent Literature

Patent Literature 1

Japanese Patent Laid-Open No. 2014-195389

SUMMARY

Technical Problem

Generally, it is known that magnets are demagnetized by temperature, an external magnetic field, or the like. Demagnetization is a phenomenon in which a magnetic force of a magnet decreases and does not recover. For example, when the field weakening control as disclosed in Patent Literature 1 is performed, an external magnetic field in a direction opposite to a magnetic field of the rotor is applied to magnets of the rotor due to the field weakening. Therefore, in particular, if the field weakening control is performed when the magnets of the rotor are at a high temperature, there is a concern that demagnetization may occur depending on a magnitude of the field weakening control. When the demagnetization occurs, characteristics of the motor deteriorate, which results in a torque shortage and an increase in current value.

An objective of the present invention is to provide a wiper device which can prevent demagnetization of a motor.

Solution to Problem

A wiper device of the present invention is a wiper device which controls a duty ratio in accordance with a target rotation speed instructed by an operation of a wiper switch and causes a wiper member to perform a wiping operation using a motor, and includes a temperature sensor which detects a temperature of the motor, a boost control unit which varies an advance angle and an energization angle associated with energization of the motor in accordance with the target rotation speed in a case in which the duty ratio has reached a predetermined upper limit value and a rotation speed of the motor is less than the target rotation speed, a first protection unit which monitors a load state of the motor and performs a first protection control for decreasing the rotational speed of the motor when a high-load state of the motor is detected, and a second protection unit which performs second protection control for fixing the advance angle and energization angle of the motor by prohibiting an operation of the boost control unit when a first condition has been satisfied in a case in which reception of an operating signal from the wiper switch when the temperature detected by the temperature sensor exceeds a first threshold and when the first protection control is being performed is set as the first condition.

In another aspect of the present invention, the second protection unit performs the second protection control when the first condition or a second condition has been satisfied in a case in which the temperature detected by the temperature sensor exceeding a second threshold higher than the first threshold is set as the second condition.

In another aspect of the present invention, the second protection unit releases the second protection control in a case in which the temperature detected by the temperature sensor is less than a third threshold lower than the first threshold when the second protection control is being performed.

In another aspect of the present invention, the second protection unit releases the second protection control in a case in which the first protection control is released when the second protection control is being performed.

Also, a wiper device of the present invention is a wiper device which controls a duty ratio in accordance with a target rotation speed instructed by an operation of a wiper switch and drives a wiper member to swing using a motor, and includes a temperature sensor which detects a temperature of the motor, a boost control unit which varies an advance angle and an energization angle associated with energization of the motor in accordance with the target rotation speed in a case in which the duty ratio has reached a predetermined upper limit value and a rotation speed of the motor is less than the target rotation speed, a load state monitoring unit which monitors a load state of the motor, and a protection unit which fixes the advance angle and the energization angle of the motor by prohibiting an operation of the boost control unit in a case in which the temperature detected by the temperature sensor exceeds a first threshold and a high-load state of the motor is detected by the load state monitoring unit.

In another aspect of the present invention, the protection unit fixes the advance angle and the energization angle of the motor by prohibiting the operation of the boost control unit when the temperature detected by the temperature sensor exceeds a second threshold higher than the first threshold.

Advantageous Effects of Invention

According to the present invention, it is possible to prohibit the boost control for varying the advance angle and the energization angle associated with the energization of the motor in a case in which the operating signal from the wiper switch is received when the temperature of the motor exceeds the first threshold and the protection control for reducing the rotation speed of the motor associated with the high-load state is being performed.

This makes it possible to prevent the magnets of the rotor from being demagnetized. In addition, it is possible to prevent a situation such as a torque shortage or an increase in current value. Further, there is no need to change a structure of the motor to increase a margin for demagnetization.

DESCRIPTION OF THE EMBODIMENTS

Figure 1:
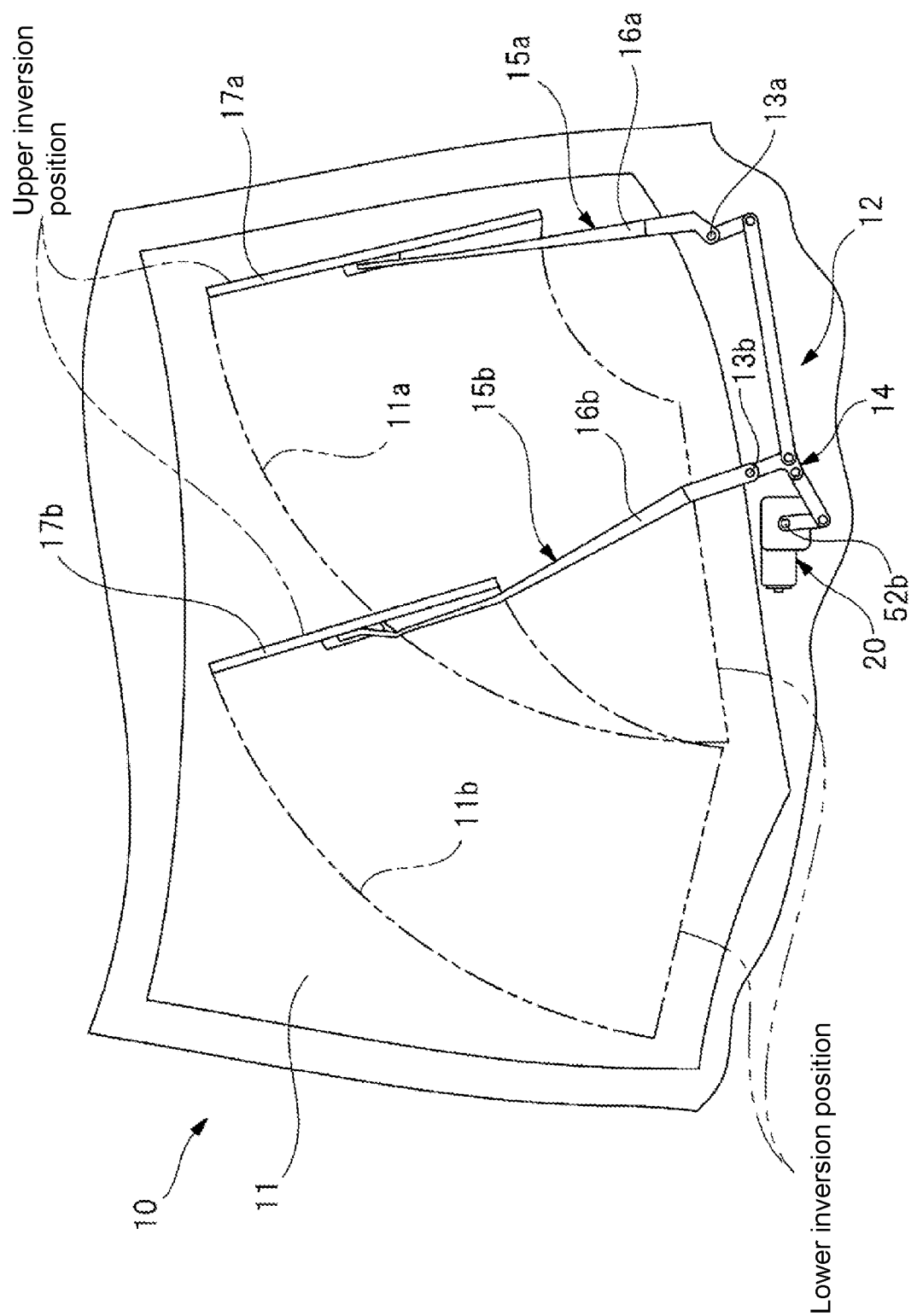
FIG. 1 is a schematic diagram showing a configuration example of a part of a vehicle equipped with a wiper device.
Figure 2:
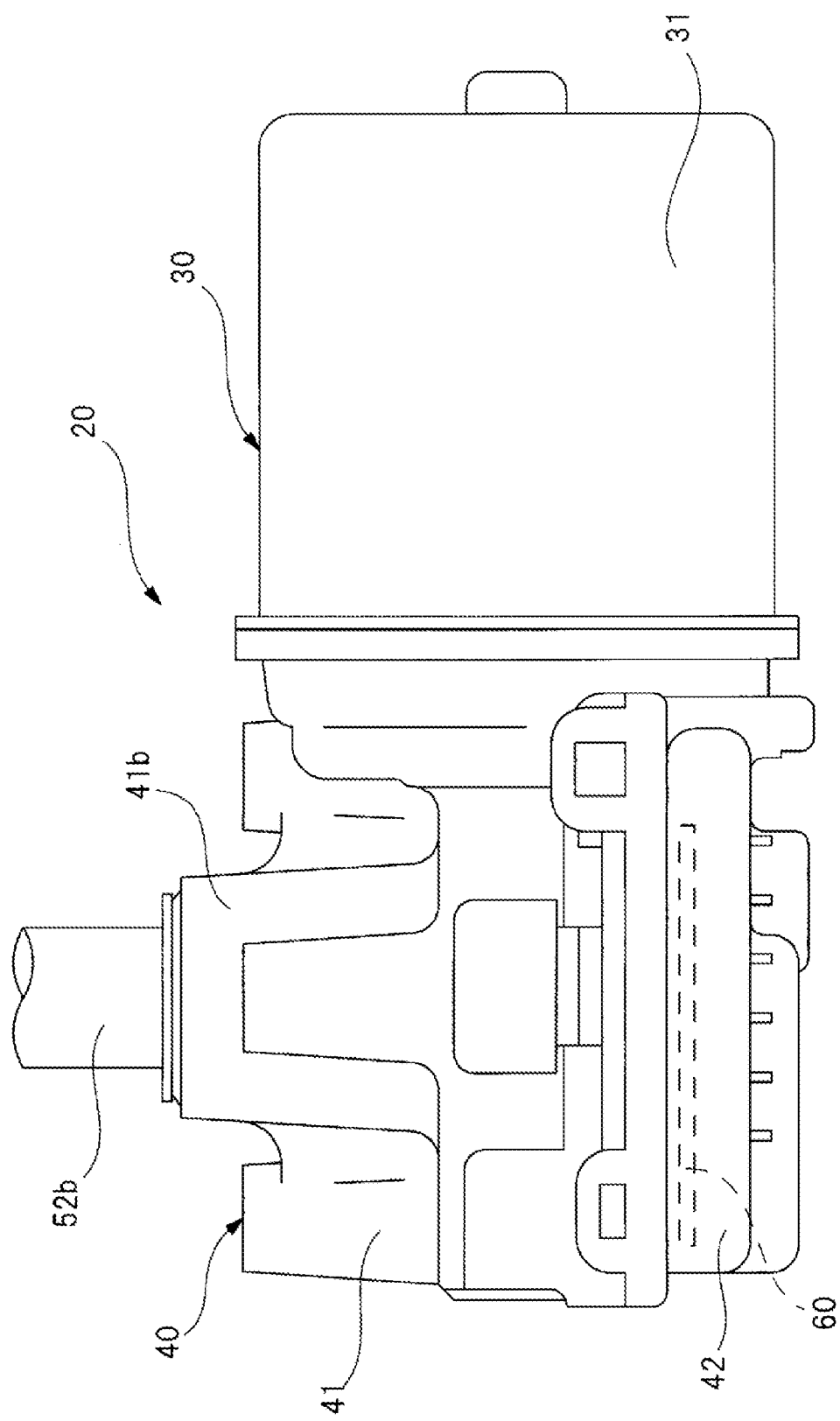
FIG. 2 is an external view showing a configuration example of a motor included in the wiper device of FIG. 1.
Figure 3:
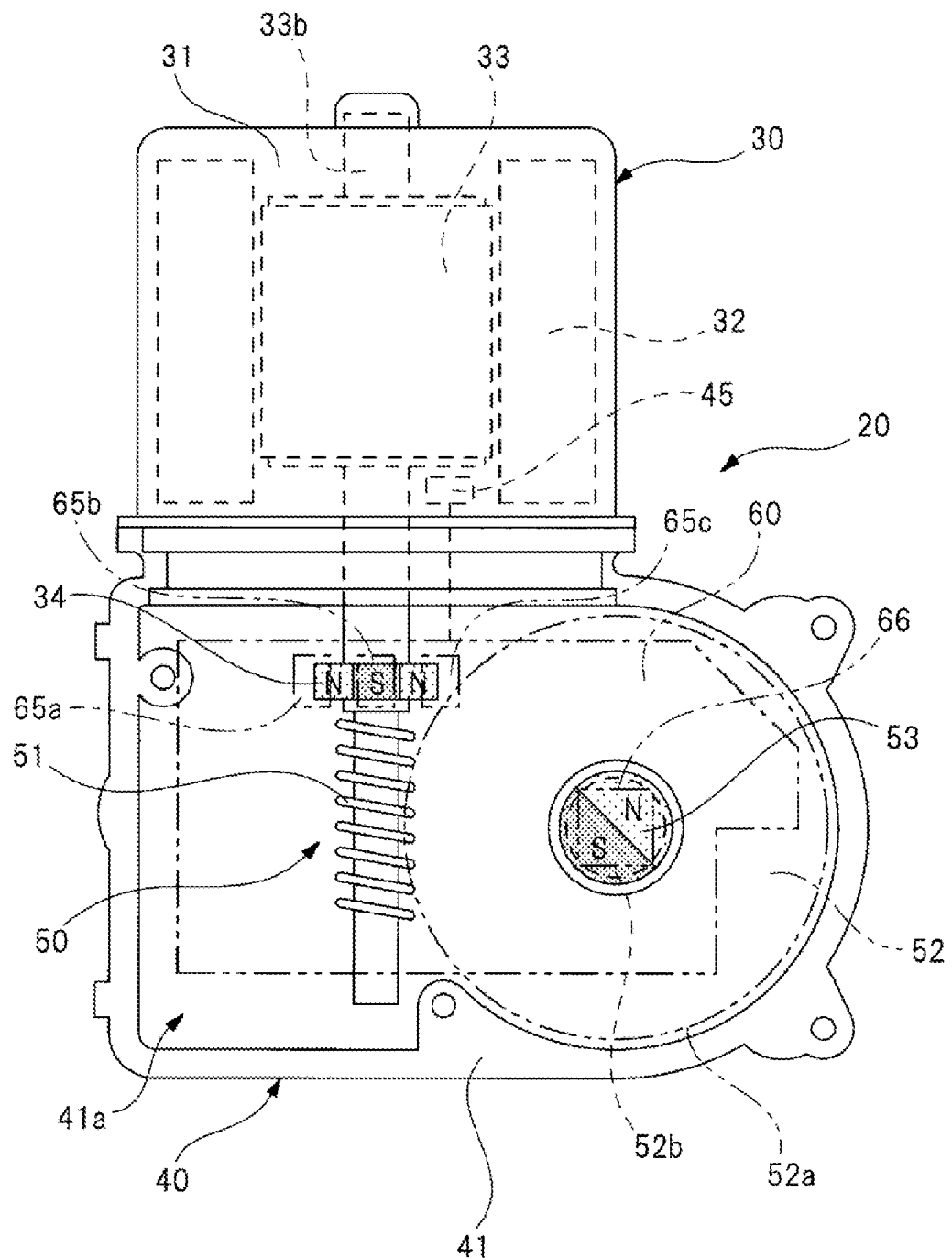
FIG. 3 is a bottom view showing an example of an internal structure of the motor shown in FIG. 2.

Hereinafter, embodiments of the present invention will be described in detail with reference to the drawings.
<Schematic Configuration of Wiper Device>
FIG. 1 is a schematic diagram showing a configuration example of a part of a vehicle equipped with a wiper device, and FIG. 2 is an external view showing a configuration example of a motor included in the wiper device of FIG. 1. FIG. 3 is a bottom view showing an example of an internal structure of the motor shown in FIG. 2, and shows a state in which a gear cover is removed from a gear housing provided in the motor shown in FIG. 2. As shown in FIG. 1, a front glass 11 is provided as a windshield in a vehicle 10 such as an automobile, and a wiper device 12 is mounted thereon near the front glass 11. The wiper device 12 is operated by turning on a wiper switch 70 (not shown) in a vehicle interior and wipes off substances adhered to the front glass 11.

The wiper device 12 includes a motor 20, a power transmission mechanism 14 which transmits a swing movement of the motor 20 to each of pivot shafts 13a and 13b, a pair of wiper members 15a and 15b of which base end sides are fixed to the pivot shafts 13a and 13b, respectively, and tip sides performs a reciprocating wiping operation on the front glass 11 due to the swing movement of the pivot shafts 13a and 13b. The motor 20 is, for example, a brushless motor. The wiper members 15a and 15b are respectively provided to correspond to a driver's seat side and a passenger's seat side and include wiper arms 16a and 16b and wiper blades 17a and 17b mounted on the wiper arms 16a and 16b.

The motor 20 causes the wiper members 15a and 15b to perform a reciprocating wiping operation. That is, when the motor 20 rotates, the swing movement of the motor 20 is transmitted to the pivot shafts 13a and 13b via the power transmission mechanism 14, and the pivot shafts 13a and 13b swing. In this manner, a driving force of the motor 20 is transmitted to the respective wiper members 15a and 15b, and the respective wiper blades 17a and 17b wipe the adhered substances in respective wiping areas 11a and 11b of the front glass 11.

In FIGS. 2 and 3, the motor 20 includes a motor body 30 and a speed reduction mechanism unit 40. The motor body 30 includes a yoke 31 formed in a bottomed cylindrical shape by pressing a steel plate piece or the like, and a stator 32 formed in an annular shape is fixed inside the yoke 31. U phase, V phase, and W phase (three-phase) coils (32a, 32b, and 32c in FIG. 4 which will be described later) are wound around the stator 32 in a star connection winding manner.

As shown in FIG. 3, a rotor 33 is rotatably provided inside the stator 32 via a predetermined gap (an air gap). Here, the rotor 33 has an interior permanent magnet (IPM) structure in which permanent magnets having a plurality of poles are embedded.

In an embodiment, a six-pole structure (see FIG. 4) in which permanent magnets having different polarities are alternately arranged at intervals of 60° in a circumferential direction of the rotor 33 will be described as an example, but it may have a four-pole structure, an eight-pole structure, or the like. In addition, the rotor 33 is not limited to the IPM structure, and may have a surface permanent magnet (SPM) structure in which a plurality of permanent magnets are attached to an outer circumferential surface of the rotor.

A rotation shaft 33b penetrates and is fixed to a rotation center of the rotor 33. A base end side (an upper side in FIG. 3) of the rotation shaft 33b is rotatably supported by a bearing (not shown) provided at a bottom part of the yoke 31, and a tip side (a lower side in FIG. 3) of the rotation shaft 33b extends to the inside of a gear housing 41 forming the speed reduction mechanism unit 40. An extension part of the rotation shaft 33b in the gear housing 41, that is, a tip side and a substantially central part of the rotation shaft 33b located in the gear housing 41, is rotatably supported by a pair of bearings (not shown) provided on the gear housing 41.

A worm 51 forming a speed reduction mechanism 50 is provided integrally with the tip side of the rotation shaft 33b. Further, a rotation shaft magnet 34 formed in an annular shape is provided integrally between the worm 51 and the rotor 33 of the rotation shaft 33b at a portion near the worm 51. The rotation shaft magnet 34 is provided on a portion of the rotation shaft 33b that extends into the gear housing 41 and includes a multi-pole permanent magnet disposed in the circumferential direction of the rotation shaft 33b. The permanent magnet of the rotation shaft magnet 34 has, for example, the same number of poles as the permanent magnet of the rotor 33 described above, and in this example, it has a six-pole structure arranged with 60° intervals in the circumferential direction of the rotation shaft 33b.

The rotation shaft magnet 34 is used not only for detecting a rotation speed of the rotation shaft 33b but also for detecting a rotation position of the rotor 33 with respect to the stator 32 via the rotation shaft 33b. Therefore, the permanent magnet of the rotation shaft magnet 34 is attached such that a polarity of the permanent magnet of the rotor 33 with respect to the rotation position of the rotation shaft 33b and a polarity of the permanent magnet of the rotation shaft magnet 34 sequentially match. By making the polarities coincide with each other in this manner, when the rotation position of the rotor 33 is detected, there is no need to perform correction control for correcting a phase shift or the like of the polarities, and thereby the control of the motor 20 is prevented from becoming complicated.

Also, the number of poles of the permanent magnet of the rotation shaft magnet 34 does not necessarily have to be the same as the number of poles of the permanent magnet of the rotor 33, and may be an integer multiple thereof. That is, the rotation shaft magnet 34 may be configured such that the polarity of the permanent magnet of the rotation shaft magnet 34 also changes at each rotation position of the rotation shaft 33b at which the polarity of the permanent magnet of the rotor 33 changes. When the number of poles of the permanent magnet of the rotation shaft magnet 34 is twice the number of poles of the permanent magnet of the rotor 33 or more, the rotation position of the rotor 33 with respect to the stator 32 can be obtained by being further subdivided, so that finer control of the rotor 33 may be performed.

As shown in FIGS. 2 and 3, the speed reduction mechanism unit 40 includes an aluminum gear housing 41 and a plastic gear cover 42 that closes an opening 41a (a front side in FIG. 3) of the gear housing 41. The yoke 31 is fixed to the gear housing 41 via a fastening member (a fixing screw or the like) that is not shown. Thus, the motor body 30 and the speed reduction mechanism unit 40 are integrated, and the worm 51 and the rotation shaft magnet 34 provided on the rotation shaft 33b are disposed in the gear housing 41.

A worm wheel 52 (not shown in detail) is rotatably provided inside the gear housing 41. The worm wheel 52 is formed in a disk shape from a resin material such as polyacetal (POM) plastic, and gear teeth 52a (not shown in detail) are formed on an outer circumferential part thereof. The gear teeth 52a of the worm wheel 52 engage with the worm 51, and the worm wheel 52 and the worm 51 constitute the speed reduction mechanism 50.

A base end side of an output shaft 52b is fixed to a rotation center of the worm wheel 52, and the output shaft 52b is rotatably supported by a boss part 41b of the gear housing 41 via a bearing (not shown). A tip side of the output shaft 52b extends outside the gear housing 41, and the power transmission mechanism 14 is fixed to a tip part of the output shaft 52b, as shown in FIG. 1. Thus, the rotation speed of the rotation shaft 33b is reduced through the worm 51 and the worm wheel 52 (the speed reduction mechanism 50), and an output of which torque is increased by this deceleration is output to the power transmission mechanism 14 via the output shaft 52b.

As shown in FIG. 3, a tablet-shaped output shaft magnet 53 is provided on a part of the output shaft 52b extending into the gear housing 41 via the worm wheel 52. The output shaft magnet 53 is attached to rotate integrally with the output shaft 52b. The output shaft magnet 53 is magnetized to an S pole in a range of approximately 180° in a circumferential direction thereof and is magnetized to a N pole in the other approximately 180° range. The output shaft magnet 53 is used to detect the rotation position of the output shaft 52b with respect to the gear housing 41.

An opening 41a of the gear housing 41 is formed to accommodate components such as the worm wheel 52 inside the gear housing 41, and the opening 41a is closed by the gear cover 42 as shown in FIG. 2. A seal member (not shown) is provided between the gear housing 41 and the gear cover 42, thereby preventing rainwater or the like from entering between the gear housing 41 and the gear cover 42 into the inside of the speed reduction mechanism unit 40. A control board 60 is mounted inside the gear cover 42 as shown in FIGS. 2 and 3. The control board 60 is electrically connected to an external power supply 100 and the wiper switch 70 (see FIG. 4) via an external connector (not shown) on the vehicle 10 side which is connected to a connector connection part (not shown) provided in the gear cover 42.

As shown in FIG. 3, three rotation shaft sensors 65a, 65b and 65c and an output shaft sensor 66 are mounted on the control board 60. The three rotation shaft sensors 65a, 65b and 65c are provided to correspond to three phases (U phase, V phase, and W phase), and are configured of Hall ICs. The Hall IC generates a Hall signal (pulse signal) whose logic level changes in accordance with a change in polarity (a change from an N pole to an S pole or a change from an S pole to an N pole). The output shaft sensor 66 is configured of, for example, a magnetoresistive (MR) sensor provided with a magnetoresistive element. The MR sensor generates an output voltage in accordance with a magnitude of a magnetic field.

Each of the rotation shaft sensors 65a to 65c is mounted at a position facing the rotation shaft magnet 34. Specifically, the rotation shaft sensors 65a to 65c are mounted on the control board 60 at equal intervals to face an outer circumferential surface (a side surface) of the rotation shaft magnet 34. Thus, each of the rotation shaft sensors 65a to 65c sequentially generates a Hall signal with a predetermined phase difference with the rotation of the rotation shaft magnet 34. Also, in the specification, the rotation shaft sensors 65a to 65c are collectively referred to as rotation shaft sensors 65. The output shaft sensor 66 is mounted on the control board 60 at a position facing the output shaft magnet 53. Thus, each output shaft sensor 66 generates a sensor signal whose voltage value continuously changes in accordance with the rotation of the output shaft magnet 53.

The motor 20 is provided with a temperature sensor 45 for detecting the temperature of the motor 20, as shown in FIG. 3. The temperature sensor 45 is, for example, a thermistor element and is provided near the rotor 33. The control board 60 can detect the temperature of the motor 20 (particularly, the rotor 33) via the temperature sensor 45.

<Details of Control Board>

Figure 4:
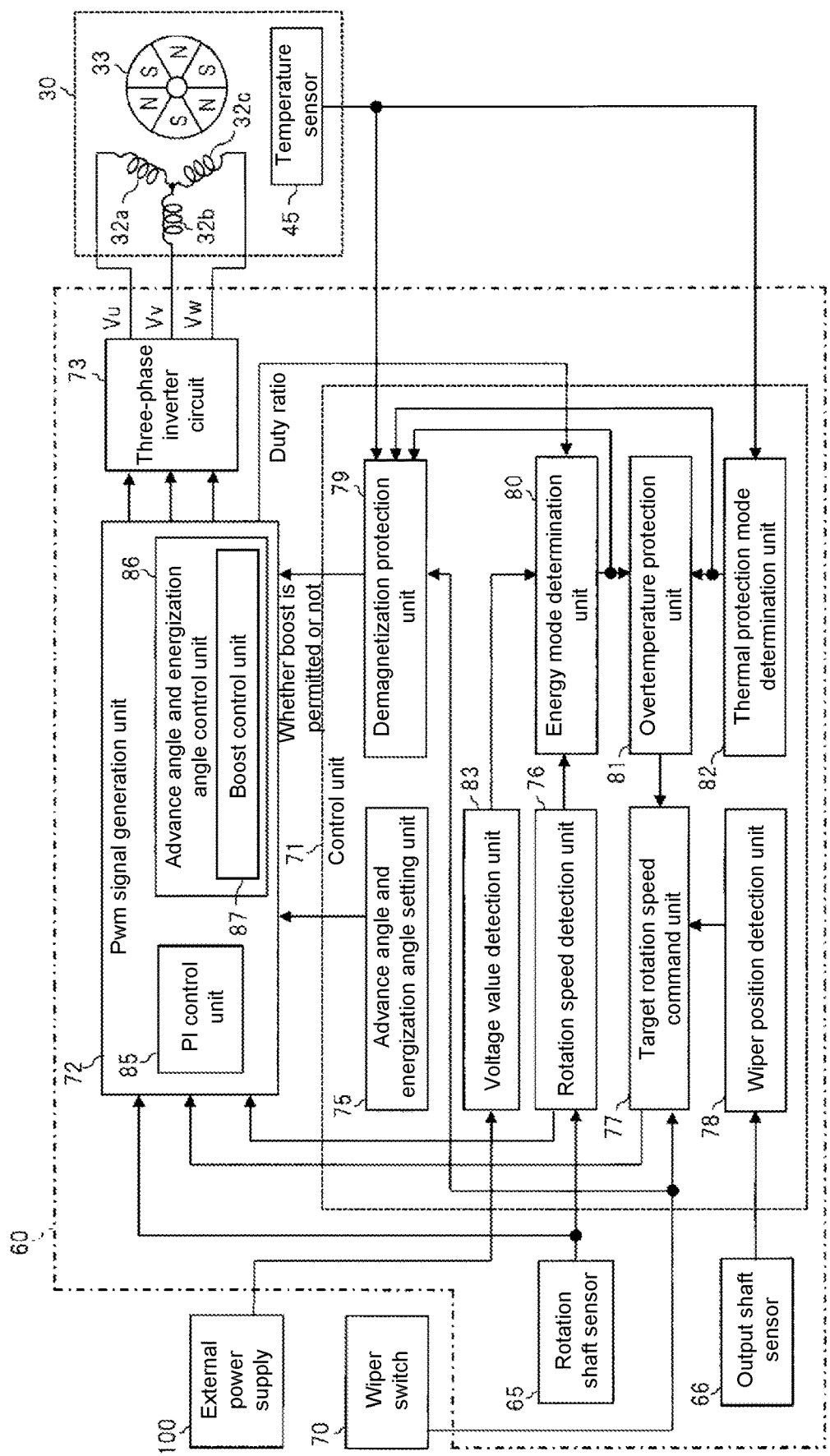
FIG. 4 is a block diagram showing a configuration example of a control board in FIGS. 2 and 3.
Figure 12:
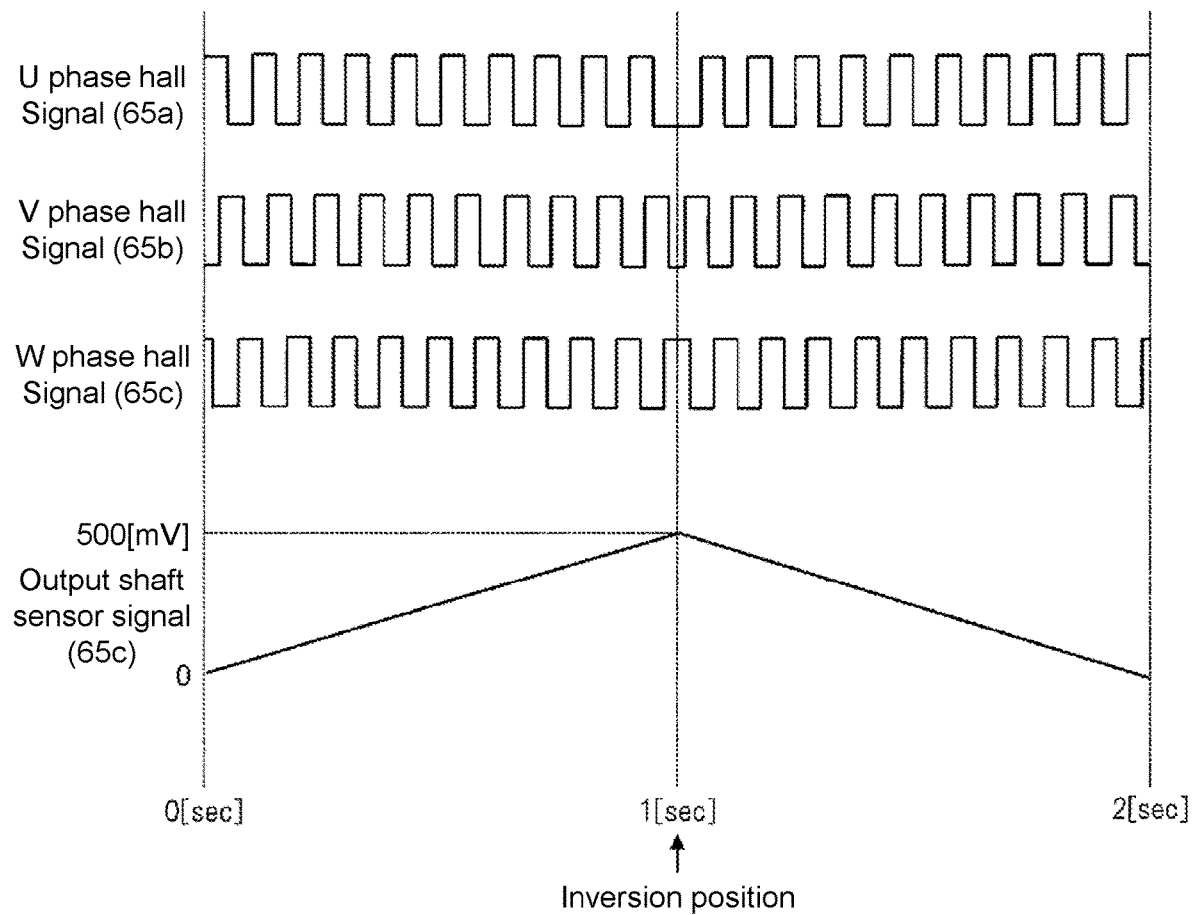
FIG. 12 is a timing chart showing examples of a Hall signal from a rotation shaft sensor and a sensor signal from an output shaft sensor in FIG. 3.

FIG. 4 is a block diagram showing a configuration example of the control board in FIGS. 2 and 3. FIG. 12 is a timing chart showing an example of the Hall signal from the rotation shaft sensor and the sensor signal from the output shaft sensor in FIG. 3. In FIG. 4, a control unit 71, a PWM signal generation unit 72, and a three-phase inverter circuit 73 are mounted on the control board 60 in addition to the rotation shaft sensors 65 and the output shaft sensor 66 described above. The control unit 71 and the PWM signal generation unit 72 are configured by program processing performed by a microcomputer including, for example, a CPU, a RAM, a ROM, and the like. However, it is needless to say that dedicated hardware may be provided instead of the program processing, or a part of the program processing may be performed by the dedicated hardware.

Although not shown, the three-phase inverter circuit 73 includes, for example, three-phase (U phase, V phase, and W phase) high-side and low-side switch elements configured of FETs or the like, and a driver circuit for controlling switching of six switch elements. The three-phase high-side switch elements are coupled between a positive electrode of the external power supply 100 (for example, a battery power supply) and three-phase output terminals (Vu, Vv, and Vw), and the three-phase low-side switch elements are coupled between a negative electrode of the external power supply and the three-phase output terminals (Vu, Vv, and Vw).

The control unit 71 includes an advance angle and energization angle setting unit 75, a rotation speed detection unit 76, a target rotation speed command unit 77, a wiper position detection unit 78, a demagnetization protection unit 79, an energy mode determination unit 80, an overtemperature protection unit 81, a thermal protection mode determination unit 82, and a voltage value detection unit 83. The voltage value detection unit 83 detects a voltage value of the external power supply 100. The rotation speed detection unit 76 detects a rotation speed of the motor 20 by counting Hall signals from the rotation shaft sensors 65 and notifies the PWM signal generation unit 72 of the detected rotation speed. The wiper position detection unit 78 detects a position of the wiper (for example, the wiper blades 17a and 17b in FIG. 1) on the basis of a sensor signal from the output shaft sensor 66.

More specifically, as shown in FIG. 12, Hall signals whose electrical angles differ by 120° are output from the respective rotation shaft sensors 65a, 65b, and 65c in accordance with the rotation position of the rotor 33. When the rotor 33 has a six-pole structure, three cycles of the electrical angle of 360° are included in one rotation of the rotor 33 (that is, within the mechanical angle of 360°). The rotation speed detection unit 76 can detect the rotation speed of the motor 20 by counting the number of pulses of each Hall signal.

On the other hand, the output shaft sensor 66 outputs a sensor signal indicating a rotation position of the output shaft 52b (and thus a position of the wiper). In this example, the output shaft 52b is driven to rotate forward in a period of 0 second to 1 second, and the wiper blades 17a and 17b reach an upper inversion position when the output shaft 52b is rotated by a predetermined angle (<360°) in a forward rotation direction. On the other hand, the output shaft 52b is reversely driven in a period of 1 second to 2 seconds, and the wiper blades 17a and 17b return to a lower inversion position when the output shaft 52b rotates by a predetermined angle in a reverse direction. That is, the wiper blades 17a and 17b make one round trip on the front glass 11 in 2 seconds.

A resistance value of the output shaft sensor (here, the MR sensor) 66 changes in accordance with a magnitude of a magnetic field that changes as the output shaft magnet 53 rotates. Thus, the output shaft sensor 66 outputs a sensor signal that changes substantially linearly within a predetermined voltage range (for example, 0 to 500 mV). Further, the output shaft sensor 66 is installed to output a maximum voltage at one second, which is the inversion position of each of the wiper blades 17a and 17b. The wiper position detection unit 78 can detect the positions of the wiper blades 17a and 17b on the basis of such sensor signals. Also, with such an operation, each Hall signal and sensor signal is symmetrical with respect to the inversion position (1 second timing).

Returning to FIG. 4, the target rotation speed command unit 77 appropriately instructs the PWM signal generation unit 72 on a target rotation speed of the motor 20 in accordance with an operating signal of the wiper switch 70 provided in the vehicle interior of the vehicle 10 and a detection result of the wiper position detection unit 78. The operating signal of the wiper switch 70 is a signal for an operator to instruct, for example, a high-speed wiping mode, a low-speed wiping mode, an intermittent wiping mode, and the like, and in other words, is a signal for instructing the target rotation speed of the motor 20.

The target rotation speed command unit 77 includes, for example, a speed map that defines a correspondence relation between the position of the wiper and the target rotation speed of the motor 20 for each wiping mode. In the speed map, for example, the contents are predetermined such that the target rotation speed is gradually increased from the lower inversion position of the wiper toward an intermediate part, a predetermined target rotation speed is maintained in the intermediate part, and then the target rotation speed is gradually reduced toward the upper inversion position of the wiper. The target rotation speed is relatively higher in the high-speed wiping mode than in the low-speed wiping mode. The target rotation speed command unit 77 sequentially instructs the PWM signal generation unit 72 on the target rotation speed on the basis of the speed map.

The advance angle and energization angle setting unit 75 instructs the PWM signal generation unit 72 on an advance angle and an energization angle, for example, in accordance with the target rotation speed from the target rotation speed command unit 77, a duty ratio from the PWM signal generation unit 72, or the like. The demagnetization protection unit 79, the energy mode determination unit 80, the overtemperature protection unit 81, and the thermal protection mode determination unit 82 perform various types of protection of the motor. Details of these will be described later.

The PWM signal generation unit 72 includes a PI control unit 85 and an advance angle and energization angle control unit 86. The PI control unit 85 performs proportional and integral (PI) control using an error between the rotation speed from the rotation speed detection unit 76 and the target rotation speed from the target rotation speed command unit 77 as an input. Also, the PI control unit 85 determines a duty ratio of the PWM signal to make the error close to zero. Further, the PWM signal generation unit 72 determines three-phase (U phase, V phase, and W phase) energization timings on the basis of the Hall signals from the rotation shaft sensors 65 (Hall ICs 65a to 65c). At this time, the advance angle and energization angle control unit 86 controls the advance angle and the energization angle at the energization timings on the basis of an instruction from the advance and energization angle setting unit 75.

Here, the advance angle and energization angle control unit 86 includes a boost control unit 87. The boost control unit 87 changes the advance angle and energization angle associated with energization of the motor 20 in accordance with the target rotation speed when the rotation speed of the motor 20 is less than the target rotation speed and the duty ratio from the PI control unit 85 has reached a predetermined upper limit value. Specifically, the boost control unit 87 increases the advance angle and the energization angle as the target rotation speed increases and increases the rotation speed of the motor using field weakening control. Also, here, the PWM signal generation unit 72 determines the energization timing on the basis of the Hall signal, but a method of determining the energization timing by detecting an induced voltage (a so-called a sensor-less system) may be used.

<Motor Driving Method (Comparative Example)>

Figure 13:
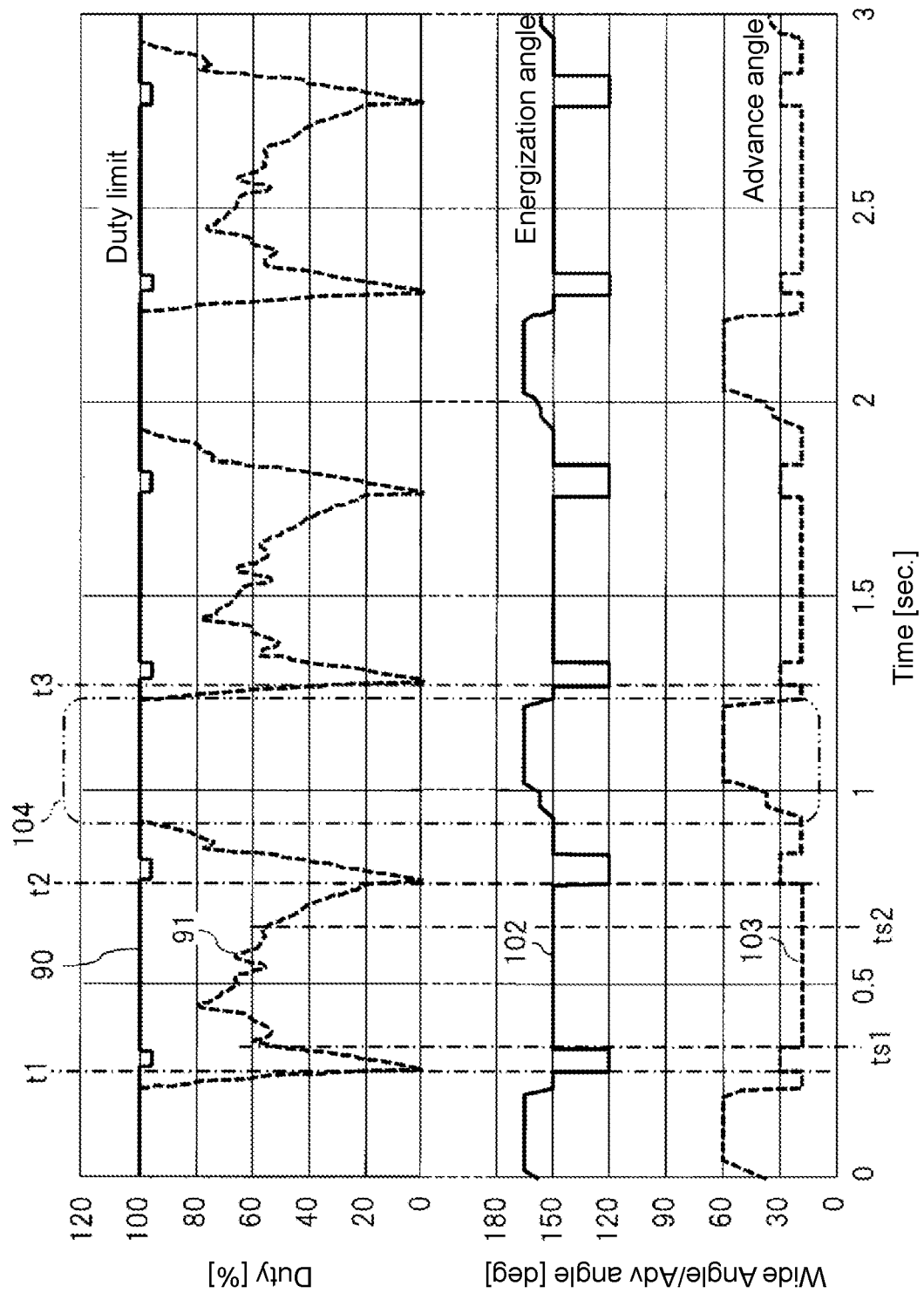
FIG. 13 is a diagram showing an example of a driving sequence of a motor using a control board serving as a comparative example in FIG. 4.
Figure 14:
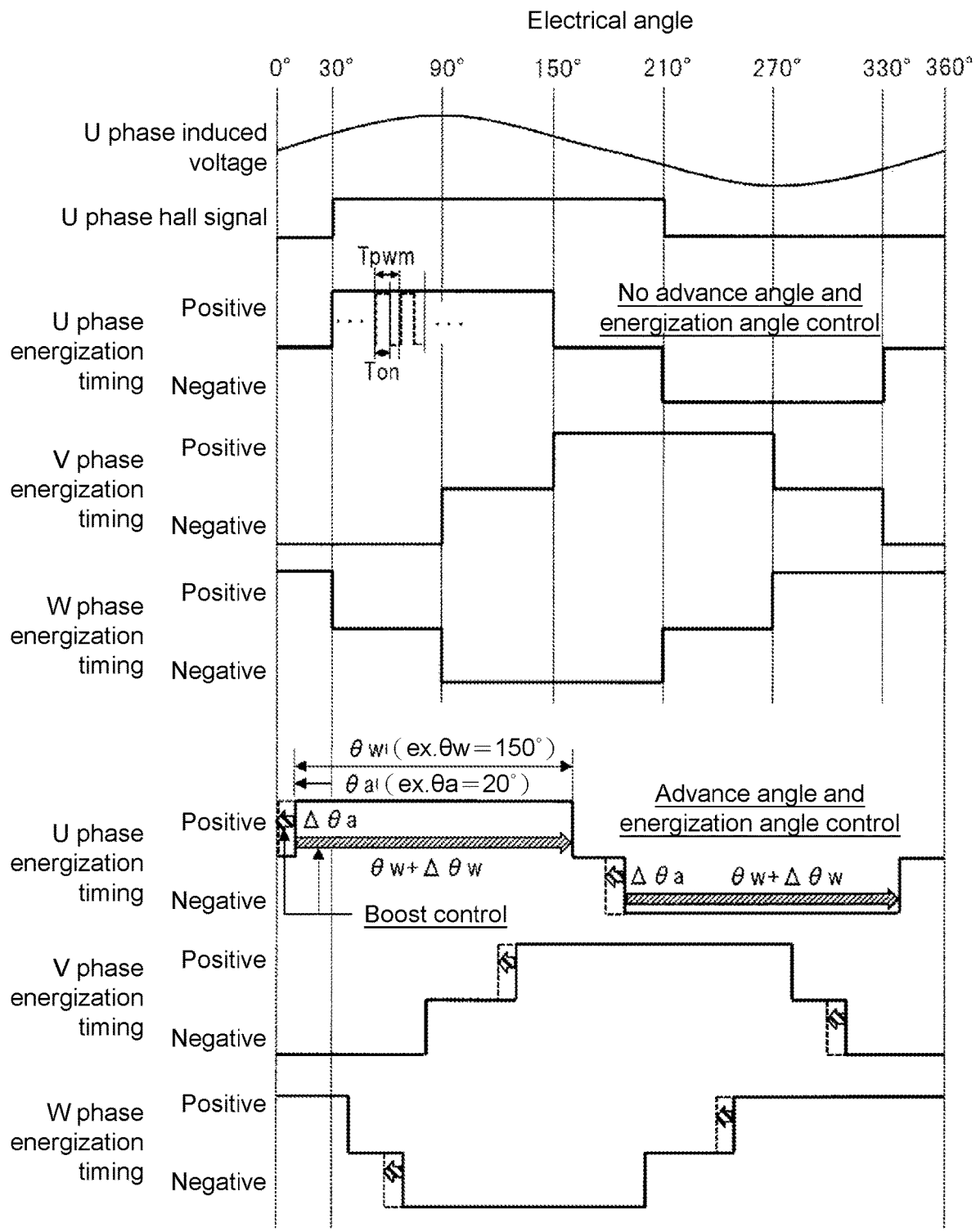
FIG. 14 is a supplementary diagram of FIG. 13 and schematically shows an example of a driving waveform of the motor.
Figure 15:
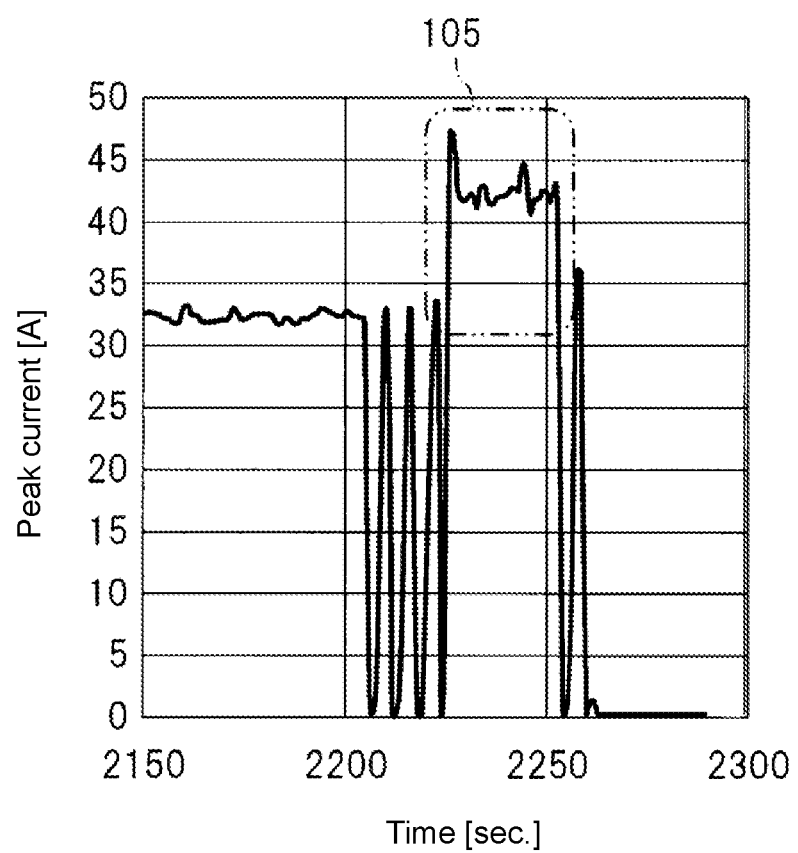
FIG. 15 is a diagram showing an example of a change in a peak current in accordance with the driving sequence of FIG. 13.

FIG. 13 is a diagram showing an example of a driving sequence of the motor using the control board as a comparative example of FIG. 4. FIG. 14 is a supplementary diagram of FIG. 13 and is a diagram schematically showing an example of a driving waveform of the motor. FIG. 15 is a diagram showing an example of a change in peak current in accordance with the driving sequence in FIG. 13. In the control board according to the comparative example, the demagnetization protection unit 79 in FIG. 4 is not provided. In FIG. 13, for example, a period from time t1 to t2 is a period in which the wiper blades 17a and 17b move from the lower inversion position to the upper inversion position, and a period from time t2 to time t3 is a period in which the wiper blades 17a and 17b return from the upper inversion position to the lower inversion position.

After time t1, the target rotation speed command unit 77 gradually increases the target rotation speed. Also, the advance angle and energization angle setting unit 75 sets the advance angle 103 to 30° and the energization angle 102 to 120°. The PWM signal generation unit 72 increases the duty ratio 91 in accordance with an increase in the target rotation speed, and outputs the PWM signal with the duty ratio set to the three-phase output terminals (Vu, Vv, and Vw) at the energization timing with the advance angle and the energization angle set. Thereafter, when the target rotation speed reaches a predetermined speed (or when the duty ratio reaches a predetermined value), the advance angle and energization angle setting unit 75 changes the advance angle 103 to 20° and the energization angle 102 to 150° (time ts1).

FIG. 14 shows energization timings of each phase (U phase, V phase, and W phase) when the advance angle is 0° and the energization angle is 120°, and energization timings in the case where the advance angle and the energization angle are changed on the basis of the above. If the advance angle is 0°, the PWM signal generation unit 72 energizes the high-side switch element at an energization angle of 120° in accordance with one edge of the Hall signal of each phase (only the U phase is shown here), and energizes the low-side switch element at an energization angle of 120° in accordance with the other edge of the Hall signal. For this reason, a non-energization period having an electrical angle of 60° is provided between the energization period of the high-side switch element and the energization period of the low-side switch element.

In each energization period, the PWM signal generation unit 72 drives each phase with a PWM signal in which a predetermined duty ratio is set. The duty ratio represents a ratio of an on-period Ton of the corresponding switch element in a PWM cycle Tpwm, and the on-period Ton extends when the duty ratio increases. When such an energization timing is used, the energization timing of each phase is synchronized with the induced voltage of the corresponding phase (only the U phase is shown here).

Here, in order to increase a motor efficiency, it is required to synchronize the induced voltage and the drive current in each phase, but in an actual operation, a drive voltage is applied on the basis of the energization timing. For this reason, the phase of the drive current is delayed with respect to the energization timing in accordance with a proportion of an inductance component and a resistance component of the motor 20 and the like. Therefore, immediately after time t1 in FIG. 13, the rotation of the motor 20 is started with the advance angle θa set to 30° and the energization angle θw set to 120° or the like. Then, at time tc, the advance angle θa is changed to 20° and the energization angle θw is changed to 150°, etc., so that the motor efficiency is improved by making a waveform shape closer to a sine wave while compensating for the phase delay of the drive current.

In the period from time ts1 to ts2 in FIG. 13, the target rotation speed is kept substantially constant by the target rotation speed command unit 77, and the PWM signal generation unit 72 appropriately controls the duty ratio 91 in accordance with a load state of the motor 20. During the period from time ts2 to time t2, the target rotation speed is instructed to gradually decrease by the target rotation speed command unit 77, and in response thereto, the PWM signal generation unit 72 gradually reduces the duty ratio 91. Also, an upper limit value 90 is set in advance for the duty ratio 91 in order to protect the motor 20. In this example, when the target rotation speed is low, a lower upper limit is set, and when the target rotation speed is high, a higher upper limit (here, approximately 100%) is set. That is, it is possible to prevent a situation where the duty ratio becomes excessively high (and a situation where a large current flows) despite the low target rotation speed.

The period between times t2 and t3 is almost the same as the period between times t1 and t2. However, in this example, unlike the period from time t1 to t2, a period 104 occurs in which the duty ratio 91 reaches the upper limit value 90 (approximately 100%). In this period 104, for example, a speed of the vehicle 10 is high, and due to a high load state caused by wind pressure, a situation occurs in which the wiper blades 17a and 17b cannot return to the lower inversion position at a predetermined target rotation speed. In other words, a situation has occurred in which a torque (i.e., drive current) required to reach the target rotation speed (or to maintain the target rotation speed) cannot be obtained sufficiently.

As described above, when the duty ratio 91 has reached the upper limit value 90 and the rotation speed of the motor 20 is lower than the target rotation speed, as shown in FIG. 13, the boost control unit 87 in FIG. 4 performs boost control that increases the advance angle and the energization angle in accordance with the target rotation speed (specifically, for example, an error between the target rotation speed and the rotation speed). In this example, the advance angle 103 increases from the state of 20° toward 60°, and the energization angle 102 increases from the state of 150° toward 165°. That is, in FIG. 14, the boost control unit 87 increases both an increment Δθa of the advance angle and an amplification Δθw of the energization angle.

In the boost control, the torque is increased using the field weakening control to increase the rotation speed. Specifically, a weakening field (a field in a direction opposite to a magnetic field direction of the rotor 33) is generated by increasing the advance angle, and, as a result, the drive voltage (that is, torque) is further increased and the rotational speed is further increased by reducing the induced voltage. In this case, in particular, if the rotor 33 having the IPM structure is used, it is possible to generate a torque (reactance torque) even using the field weakening.

However, when such boost control (field weakening control) is performed, as shown in a period 105 in FIG. 15, a peak current increases, and accordingly, a large magnetic field is generated from the stator 32. In particular, if a large external magnetic field (field weakening) is applied from the stator 32 when the magnet of the rotor 33 is at a high temperature, the magnet may be demagnetized. The magnet is, for example, a neodymium magnet. When the demagnetization occurs, characteristics of the motor 20 are degraded, which results in a torque shortage, an increase in a current value for obtaining a required torque (and a decrease in motor efficiency), and the like.

<Motor Driving Method (Embodiment)>

Figure 5:
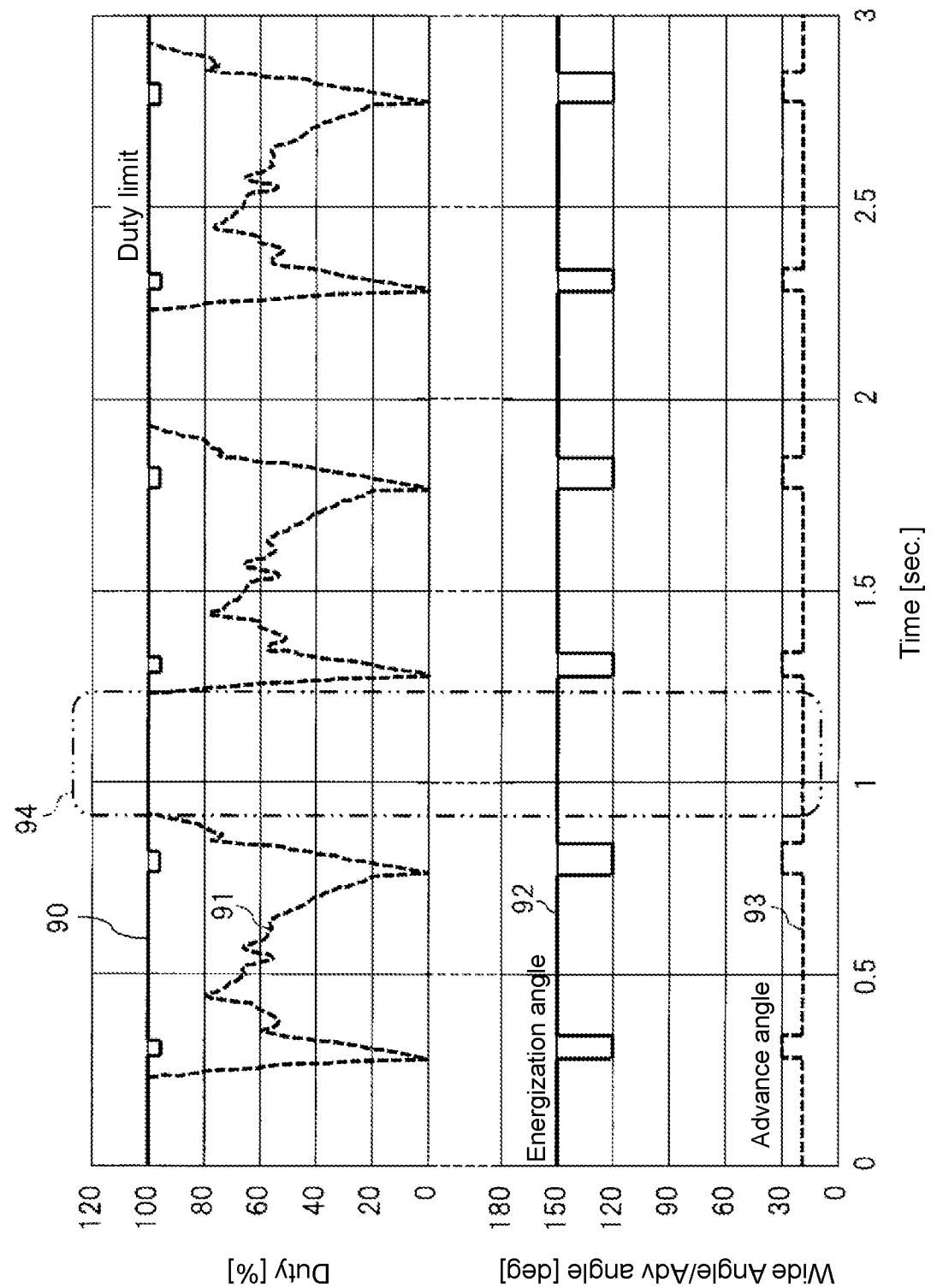
FIG. 5 is a diagram showing an example of a driving sequence of the motor using the control board in FIG. 4.

FIG. 5 is a diagram showing an example of a driving sequence of the motor using the control board of FIG. 4. The driving sequence shown in FIG. 5 is different from the driving sequence shown in FIG. 13 in that, in the period 94, the boost control is prohibited, and the advance angle 93 and the energization angle 92 of the motor 20 are fixed at 20° and 150°, respectively. Schematically, the energy mode determination unit 80 illustrated in FIG. 4 functions as a load state monitoring unit that monitors a load state of the motor 20, and detects a high load state. The high load state is, for example, a state in which the duty ratio from the PWM signal generation unit 72 is large (that is, the drive current is large) with respect to the rotation speed of the motor 20 detected by the rotation speed detection unit 76, and, for example, a state in which a wind pressure is large, as described in FIG. 13.

The demagnetization protection unit (a second protection unit) 79 fixes the advance angle 93 and the energization angle 92 by prohibiting an operation of the boost control unit 87 when the temperature detected by the temperature sensor 45 exceeds a first threshold (for example, 65° C.) and the energy mode determination unit 80 detects a high load state. Also, the demagnetization protection unit 79 prohibits the operation of the boost control unit 87 even when the temperature detected by the temperature sensor 45 exceeds a second threshold (for example, 95° C.).

Figure 6:
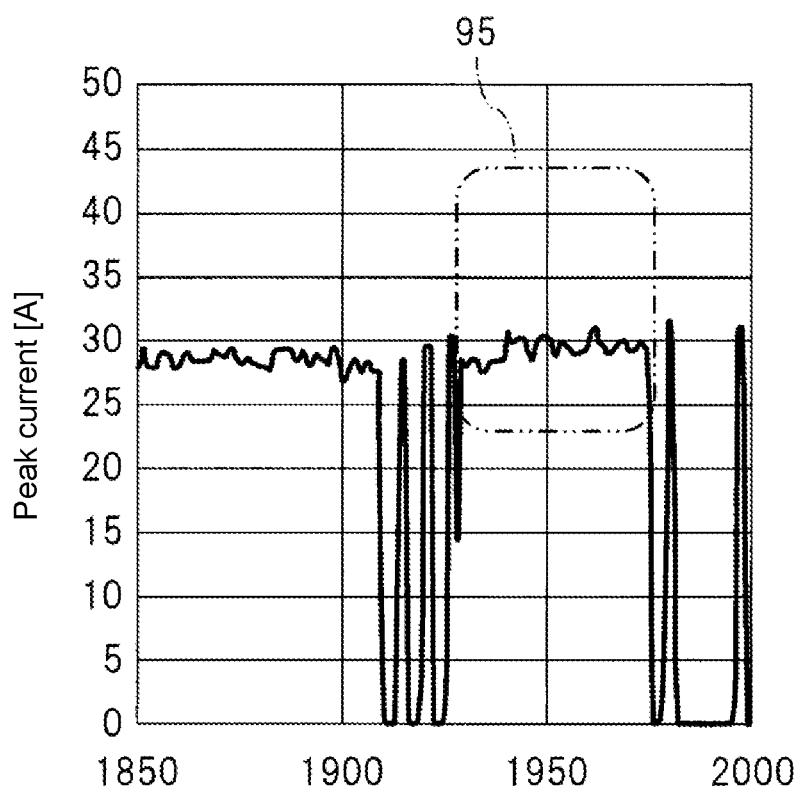
FIG. 6 is a diagram showing an example of a change in a peak current in accordance with the driving sequence of FIG. 5.

FIG. 6 is a diagram showing an example of a change in the peak current in accordance with the driving sequence of FIG. 5. Since the boost control is prohibited by using the drive sequence of FIG. 5, an increase in the peak current can be inhibited as shown in a period 95 in FIG. 6, unlike the case in the period 105 in FIG. 15. As a result, a situation in which a large external magnetic field is applied from the stator 32 to the rotor 33 does not occur, and demagnetization of the magnet of the rotor 33 can be prevented. In addition, it is possible to prevent a situation such as a torque shortage or an increase in current value. Further, there is no need to change a motor structure to increase a margin for demagnetization.

Here, the motor 20 is generally driven such that the rotational speed and the torque are balanced with respect to a drive voltage proportional to the duty ratio. As a situation where the duty ratio reaches the upper limit, for example, there are considered a situation A in which the torque (that is, drive current) is not so large but the rotation speed is very high, and a situation B in which the rotation speed is relatively low but the torque (that is, drive current) is very large.

In the former situation A, the drive current is not very large and there is some margin for demagnetization in terms of drive current. However, when the temperature becomes excessive, the margin for demagnetization decreases from the viewpoint of the drive current. Therefore, when the temperature of the rotor 33 exceeds the second threshold (95° C.), the demagnetization protection unit 79 prohibits the boost control. On the other hand, in the latter situation, since the drive current is very large, the margin for demagnetization decreases even when the temperature is somewhat lower than the second threshold (95° C.). Therefore, the demagnetization protection unit 79 prohibits the boost control when a high load state is detected (that is, a situation where the drive current can be very large is detected) and the temperature exceeds the first threshold (65° C.).

As described above, by using two conditions, that is, the case in which the temperature exceeds the second threshold (95° C.) and the case in which the temperature exceeds the first threshold (65° C.) and the load state is in a high load state, more appropriate protection against demagnetization can be achieved as compared to the case where only one of the conditions is used. Also, when the boost control is prohibited, a wiping speed of the wiper may be lower than a target, but the protection of the motor 20 is given priority over that, and the wiping speed of the wiper is limited to the highest wiping speed that can protect the motor 20. For example, when an operator has an intention to increase the wiping speed of the wiper, the wiper device performs the wiping operation at the fastest wiping speed at which protection can be achieved while reflecting the intention of the operator.

<Details of Motor Protection>

Figure 7:
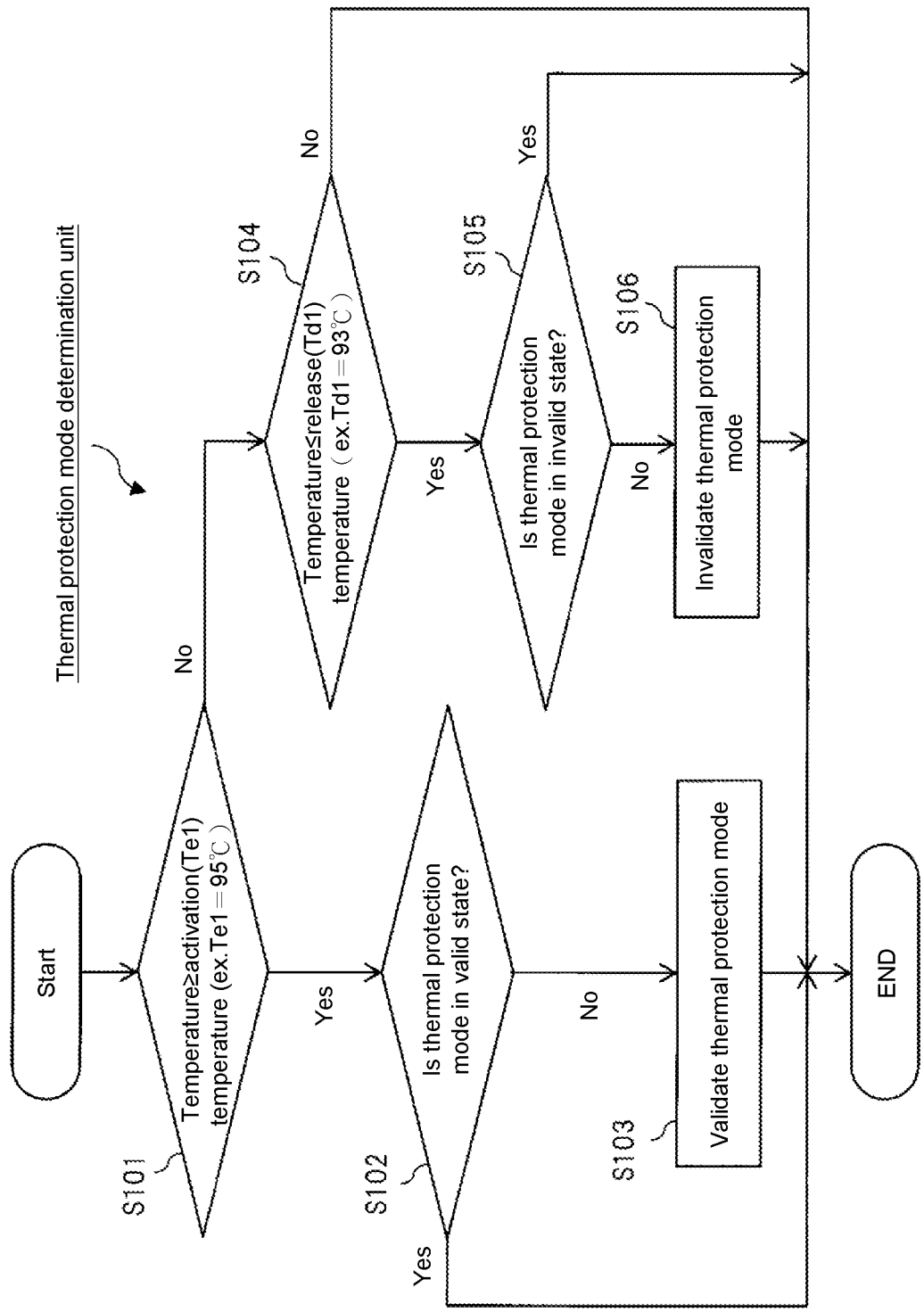
FIG. 7 is a flowchart showing a detailed operation example of a thermal protection mode determination unit in FIG. 4.

FIG. 7 is a flowchart showing a detailed operation example of the thermal protection mode determination unit in FIG. 4. The thermal protection mode determination unit 82 repeatedly executes the flow. Here, it is assumed that the thermal protection mode determination unit 82 has set a thermal protection mode to an invalid state as an initial state. In FIG. 7, first, the thermal protection mode determination unit 82 determines whether or not the temperature detected by the temperature sensor 45 has exceeded an activation temperature (a second threshold (for example, 95° C.)) (step S101). If the temperature exceeds the activation temperature, the thermal protection mode determination unit 82 determines whether or not the thermal protection mode is in the valid state (step S102), and if not, activates the thermal protection mode (step S103).

On the other hand, in step S101, when the temperature detected by the temperature sensor 45 does not satisfy the activation temperature, the thermal protection mode determination unit 82 determines whether or not the temperature detected by the temperature sensor 45 is lower than a release temperature (for example, 93° C.) (step S104). If the temperature is lower than the release temperature, the thermal protection mode determination unit 82 determines whether or not the thermal protection mode is in the invalid state (step S105), and if not, invalidates the thermal protection mode (step S106). Also, in step S104, if the temperature detected by the temperature sensor 45 is not less than the release temperature (for example, 94° C.), the thermal protection mode determination unit 82 maintains the valid state or invalid state of the thermal protection mode so far as it is. As a result, for example, once the detected temperature exceeds 95° C., the valid state of the thermal protection mode is maintained until the detected temperature falls below 93° C.

Figure 8:
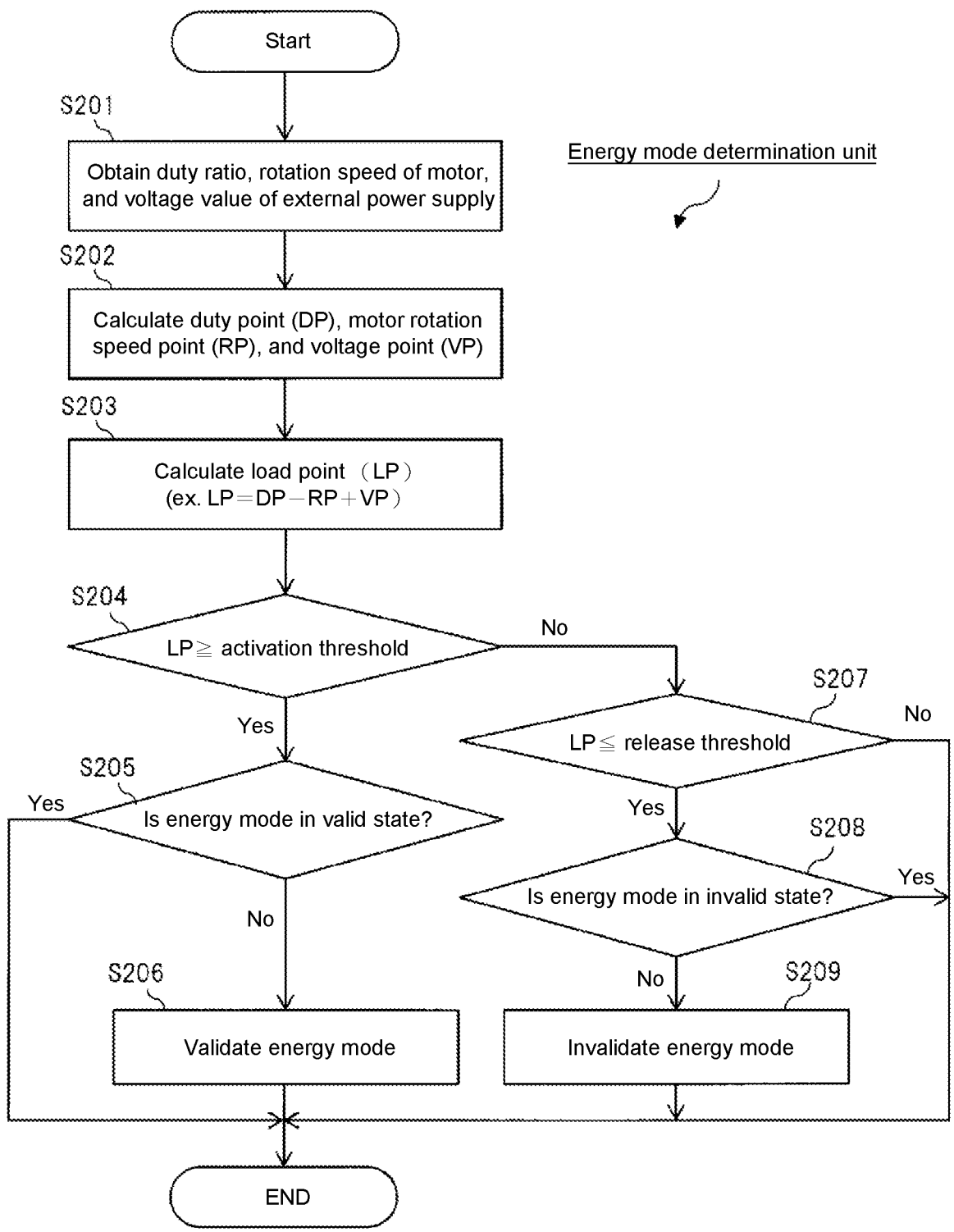
FIG. 8 is a flowchart showing a detailed operation example of an energy mode determination unit in FIG. 4.

FIG. 8 is a flowchart showing a detailed operation example of the energy mode determination unit in FIG. 4. The energy mode determination unit 80 repeatedly executes the flow. Here, it is assumed that the energy mode determination unit 80 has set an energy mode to an invalid state as an initial state. In FIG. 8, the energy mode determination unit 80 first obtains a duty ratio from the PWM signal generation unit 72, a rotation speed from the rotation speed detection unit 76, and a voltage value from the voltage value detection unit 83 (step S201).

Subsequently, the energy mode determination unit 80 calculates a duty point (DP), a motor rotation speed point (RP), and a voltage point (VP) (step S202). The duty point (DP) is a value proportional to a magnitude of the acquired duty ratio and is calculated by multiplying the duty ratio by a predetermined coefficient. The motor rotation speed point (RP) is a value proportional to the obtained rotation speed and is calculated by multiplying the rotation speed by a predetermined coefficient. The voltage point (VP) is a value proportional to the acquired voltage value and is calculated by multiplying the voltage value by a predetermined coefficient.

Next, the energy mode determination unit 80 calculates a load point (LP) (step S203). The load point (LP) is calculated by, for example, "duty point (DP)-motor rotation speed point (RP)+voltage point (VP)." The load point (LP) increases, for example, as the duty point (DP) and the voltage point (VP) increase (that is, as the duty ratio and the voltage value of the external power supply 100 increase), and as the motor rotation speed point (RP) decreases (that is, the rotation speed decreases).

Subsequently, the energy mode determination unit 80 determines whether or not the load point (LP) has exceeded the activation threshold (step S204). If the activation threshold is exceeded, the energy mode determination unit 80 determines whether or not the energy mode is in the valid state (step S205), and if not, activates the energy mode (step S206). Here, the valid state of the energy mode means a high load state.

On the other hand, in step S204, when the load point (LP) does not satisfy the activation threshold, the energy mode determination unit 80 determines whether or not the load point (LP) has fallen below the release threshold (<activation threshold) (step S207). When the load point (LP) is lower than the release threshold, the energy mode determination unit 80 determines whether or not the energy mode is in the invalid state (step S208), and, if not, invalidates the energy mode (step S209). Further, in step S207, if the load point (LP) is not less than the release threshold, the energy mode determination unit 80 maintains the valid state or invalid state of the energy mode so far as it is. As a result, for example, when the load point (LP) once exceeds the activation threshold, the valid state of the energy mode is maintained until the value falls below the release threshold.

Figure 9:
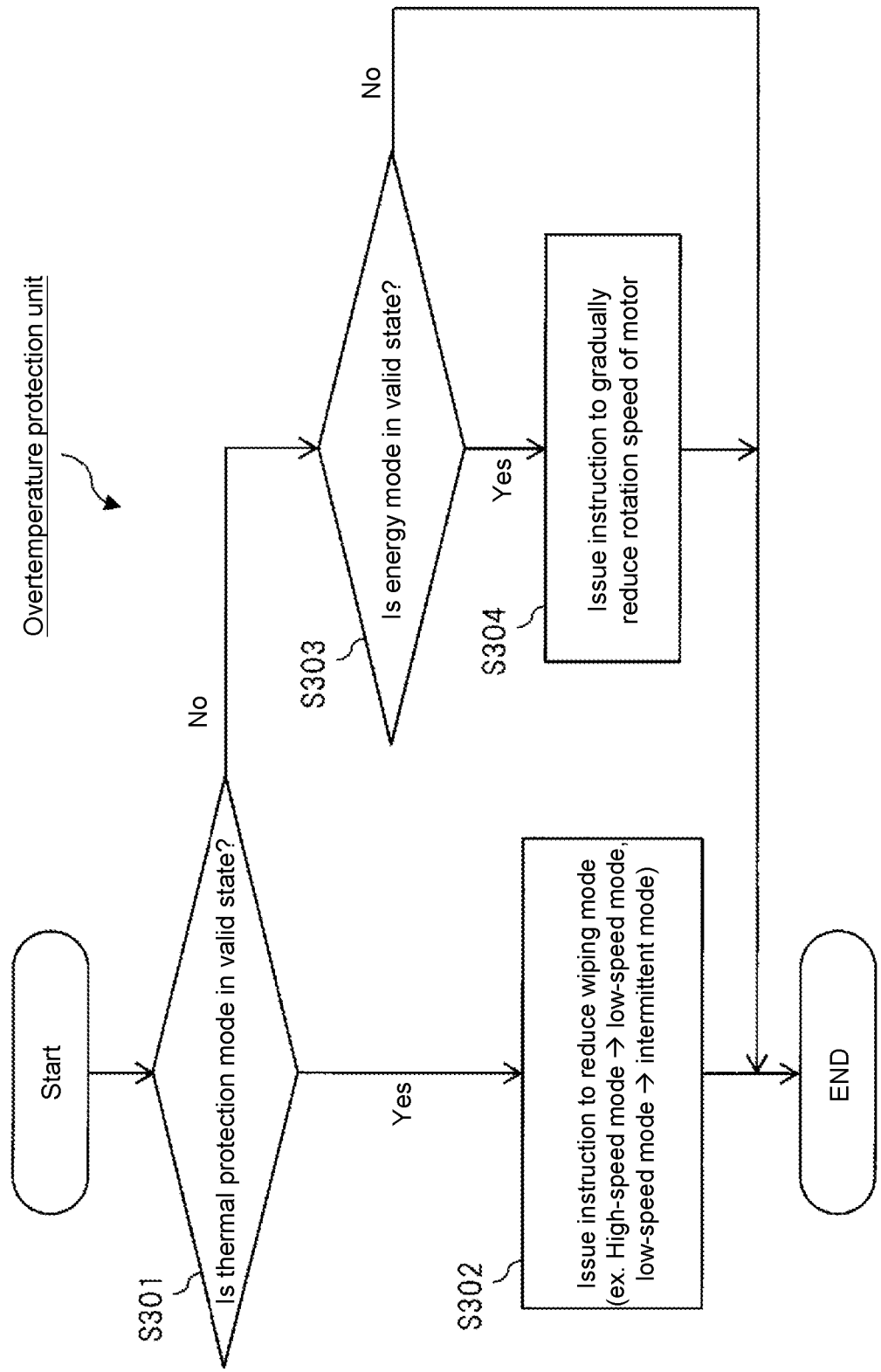
FIG. 9 is a flowchart showing a detailed operation example of an overtemperature protection unit in FIG. 4.

FIG. 9 is a flowchart showing a detailed operation example of the overtemperature protection unit in FIG. 4. In FIG. 9, first, the overtemperature protection unit 81 determines whether or not the thermal protection mode is in a valid state (step S301). When the thermal protection mode is in the valid state, the overtemperature protection unit 81 issues an instruction to the target rotation speed command unit 77 to lower the wiping mode (step S302). In response thereto, the target rotation speed command unit 77 changes the speed map, for example, to the low-speed wiping mode when the high-speed wiping mode is instructed by operating the wiper switch 70, and changes the speed map to the intermittent wiping mode when the low-speed wiping mode is instructed. As described above, when the temperature of the motor 20 exceeds the activation temperature (the second threshold (95° C.)) described in FIG. 7, the overtemperature protection unit 81 cools the motor 20 by lowering the wiping mode of the motor 20.

On the other hand, when the thermal protection mode is in the invalid state in step S301, the overtemperature protection unit (a first protection unit) 81 determines whether or not the energy mode is in a valid state (step S303). When energy mode is in the valid state, the overtemperature protection unit 81 issues an instruction to the target rotation speed command unit 77 to gradually decrease the rotation speed of the motor 20 (step S304). In response to this, the target rotation speed command unit 77 gradually decreases the target rotation speed over time, for example, in order to reduce a current target rotation speed to half its speed. The target rotation speed command unit 77 also has a speed map for such an energy mode.

Thus, when the energy mode is in the valid state (that is, when the load is detected to be high), the overtemperature protection unit (first protection unit) 81 performs protection control (first protection control) for reducing the rotation speed of the motor 20. In this case, unlike the case of the thermal protection mode, the overtemperature protection unit 81 gradually reduces the rotation speed of the motor 20 over time, thereby preventing the temperature of the motor 20 from rising while preventing the operator from clearly recognizing the speed drop. That is, since the high load state is a state that easily reaches the thermal protection mode, the overtemperature protection unit 81 performs prevention in advance on the basis of the energy mode before the thermal protection mode is reached.

Figure 10:
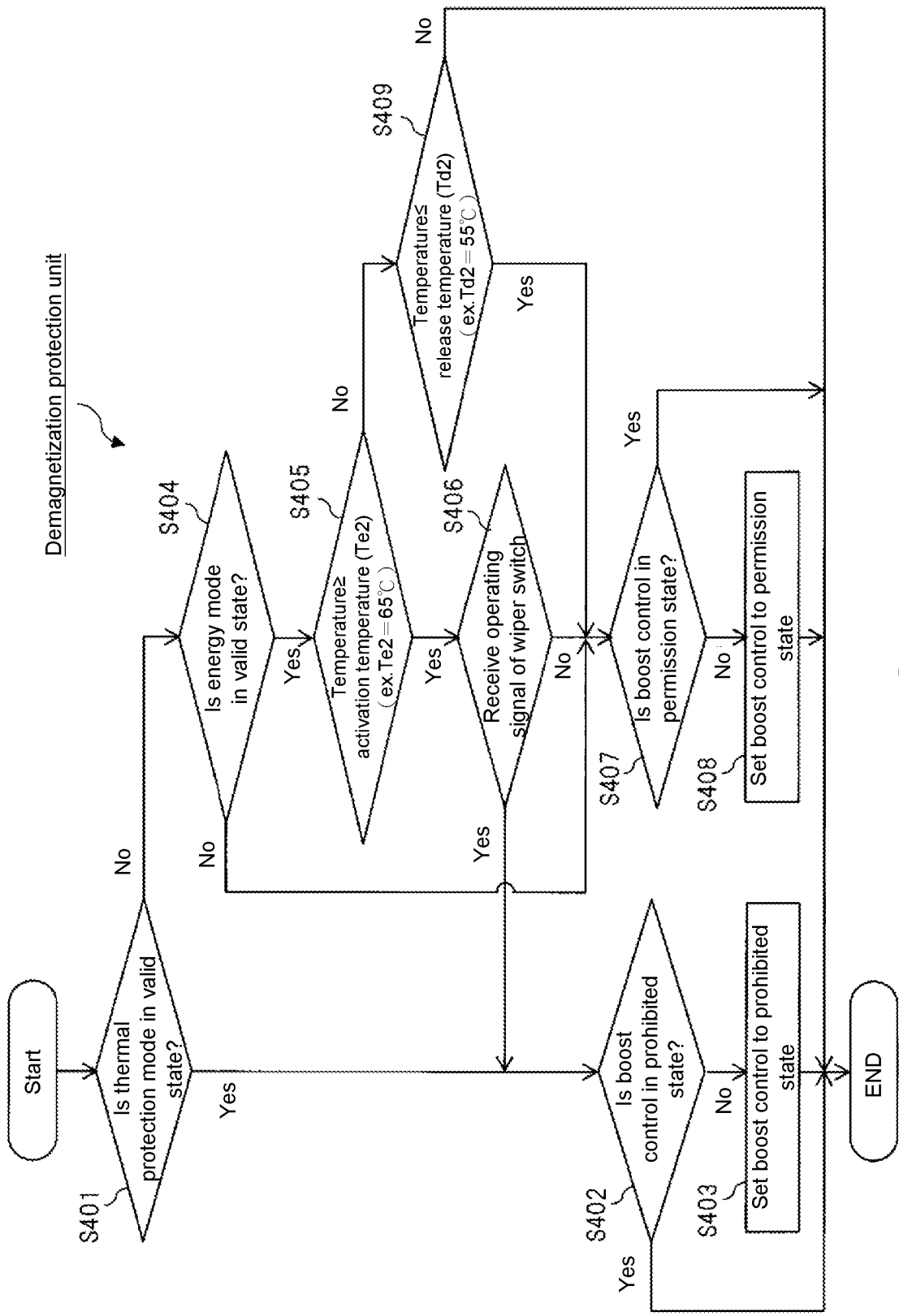
FIG. 10 is a flowchart showing a detailed operation example of a demagnetization protection unit in FIG. 4.

FIG. 10 is a flowchart showing a detailed operation example of the demagnetization protection unit in FIG. 4. Here, it is assumed that the demagnetization protection unit (second protection unit) 79 has set the boost control to a permission state as an initial state. In FIG. 10, the demagnetization protection unit 79 first determines whether or not the thermal protection mode is in a valid state (step S401). When the thermal protection mode is in the valid state, the demagnetization protection unit 79 determines whether or not the boost control is in a prohibited state (step S402), and if not, sets the boost control to the prohibited state (step S403).

On the other hand, if the thermal protection mode is in the invalid state in step S401, the demagnetization protection unit 79 determines whether or not the energy mode is in a valid state (step S404). If the energy mode is in the invalid state, the demagnetization protection unit 79 determines whether or not the boost control is in the permission state (step S407), and if not, sets the boost control to the permitted state (step S408). On the other hand, if the energy mode is in the valid state, the demagnetization protection unit 79 determines whether or not the temperature detected by the temperature sensor 45 has exceeded the activation temperature (first threshold value) (for example, 65° C.) (step S405).

If the temperature exceeds the activation temperature in step S405, the demagnetization protection unit 79 determines whether or not an operating signal of the wiper switch 70 (specifically, an operating signal for increasing the speed) has been received (step S406). If the operating signal is received, the demagnetization protection unit 79 sets the boost control to the prohibition state (steps S402 and S403), and if not receiving the operating signal, sets the boost control to the permission state (step S407 and step S408).

On the other hand, if the temperature detected by the temperature sensor 45 is lower than the activation temperature (first threshold (65° C.)) in step S405, the demagnetization protection unit 79 determines whether or not the temperature further falls below a release temperature (a third threshold (for example, 55° C.)) (step S409). If the temperature falls below the release temperature, the demagnetization protection unit 79 sets the boost control to the permission state (steps S407 and S408), and if not fall below the release temperature, maintains the current state of the boost control as it is.

As described above, the boost control is set to the prohibited state (steps S401 to S403) when the thermal protection mode is in the valid state, that is, when the temperature detected by the temperature sensor 45 exceeds the activation temperature (second threshold (95° C.)) in FIG. 7) (a second condition). Alternatively, the boost control is set to the prohibited state (steps S404 to S406, S402, and S403) when the energy mode is in the valid state, and when the temperature detected by the temperature sensor exceeds the activation temperature (first threshold (65° C.)) and the operating signal from the wiper switch 70 is received (a first condition). Here, as shown in FIGS. 8 and 9, the case in which the energy mode is in the valid state is a case in which a high load state is detected and the protection control (first protection control) for reducing the rotation speed of the motor is being performed.

On the other hand, the boost control set to the prohibited state is changed to the permission state (steps S404, S405, S407 to S409) when the energy mode is changed to the invalid state or when the temperature detected by the temperature sensor falls below the release temperature (third threshold value (55° C.)). For example, the boost control that is set to the prohibited state by exceeding the activation temperature (first threshold value) (65° C.) is maintained in the prohibited state until the temperature falls below the release temperature (third threshold value) (55° C.). With such hysteresis control, for example, an unstable situation in which the boost control is changed from the prohibited state to the permission state and then immediately returns to the prohibited state can be avoided.

Figure 11:
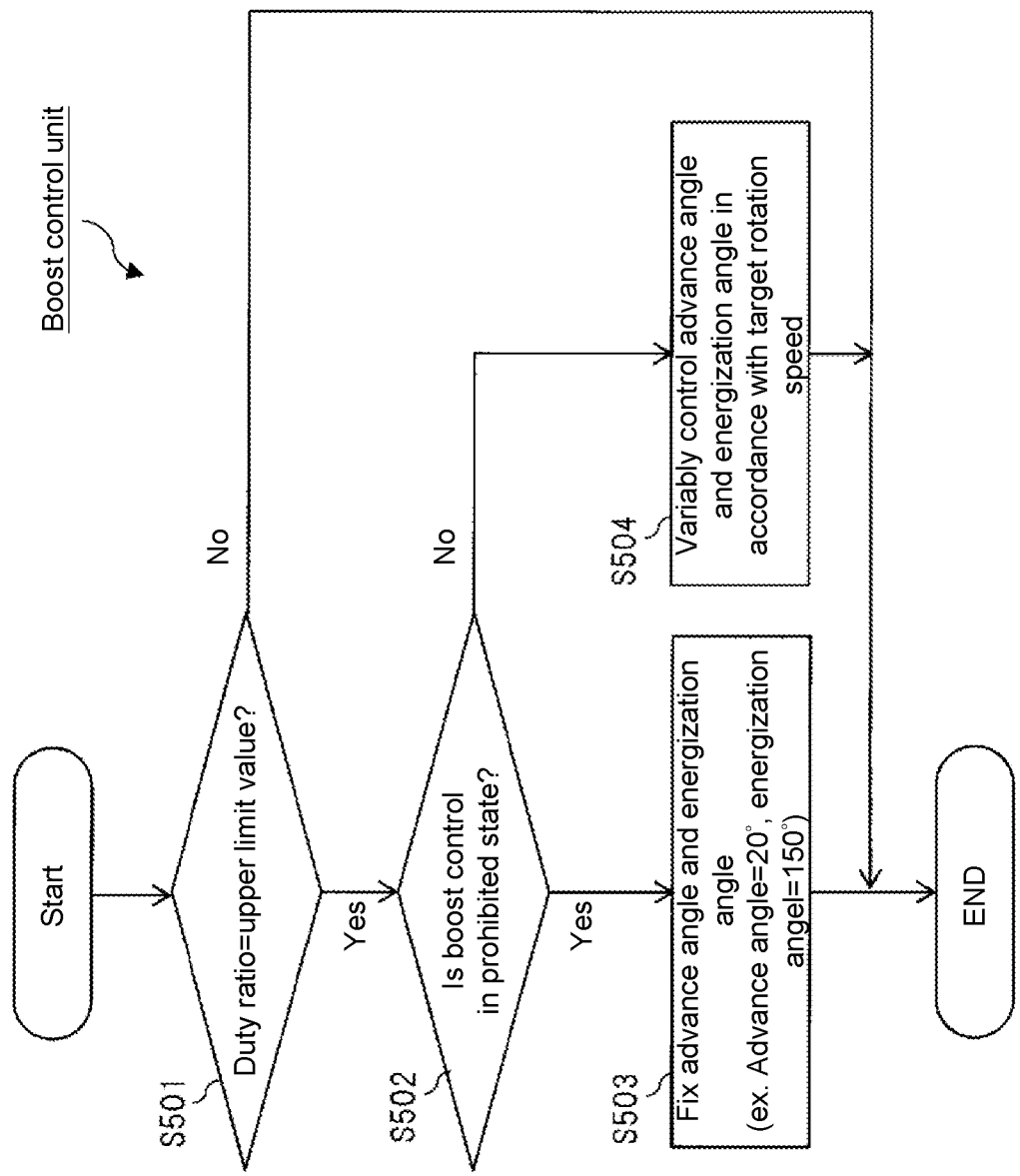
FIG. 11 is a flowchart showing a detailed operation example of a boost control unit in FIG. 4.

FIG. 11 is a flowchart showing a detailed operation example of the boost control unit in FIG. 4. The boost control unit 87 determines whether or not the duty ratio from the PI control unit 85 has reached a predetermined upper limit value (step S501). If the upper limit has been reached, the boost control unit 87 determines whether or not the boost control has been set to the prohibited state by the demagnetization protection unit 79 (step S502). If the boost control is set to the prohibited state, as shown in FIG. 5, the boost control unit 87 determines an energization timing in which the advance angle and the energization angle are fixed (step S503). On the other hand, if the boost control is set to the permission state, as illustrated in FIG. 13, the boost control unit 87 determines an energization timing in which the advance angle and the energization angle are changed in accordance with the target rotation speed (specifically, for example, an error between the target rotation speed and the rotation speed) (step S504).

As described above, the demagnetization protection unit 79 prohibits the operation of the boost control unit 87 schematically when the temperature detected by the temperature sensor 45 exceeds the activation temperature (first threshold (65° C.)) and the high load state is detected by the load state monitoring unit. In this case, in the embodiment, as shown in FIGS. 8 and 10, the energy mode determination unit 80 is used as the load state monitoring unit. If the energy mode determination unit 80 is used, as shown in FIG. 9, when the energy mode is in the valid state (that is, when the high load state is detected), the protection control (first protection control) for reducing the rotation speed of the motor operates, and accordingly, the boost control becomes difficult to be performed, and protection is effectively performed against demagnetization.

However, in this state, a problem occurs when the operating signal for increasing the speed is received from the operator. In this case, for example, since the operator may issue an instruction to increase the speed in order to secure a view ahead, the wiper device is required to give priority to the operator's instruction over the energy mode, and perform speed-up control. Then, since the speed-up control is performed under a high load state, the boost control occurs as it is, and the problem of demagnetization occurs.

Therefore, in the example of FIG. 10, the demagnetization protection unit 79 sets the boost control to the prohibition state on the condition that the operating signal from the wiper switch 70 is received, as shown in step S406. Thus, the rotation speed of the motor, which is reduced to, for example, half a normal speed in the energy mode, increases to the highest rotation speed that can be increased without using the boost control in accordance with the instruction from the operator. In addition, by performing the demagnetization protection together with the protection control in the energy mode as described above, the demagnetization protection can be performed more efficiently. That is, basically, due to the energy mode, the demagnetization protection can be performed in addition to the overtemperature protection, so that the demagnetization protection unit 79 can cover the demagnetization protection in a situation where this protection is forcibly released (that is, a situation where the instruction to increase the speed is issued from the operator). Therefore, even when a permanent magnet or a magnet having a property of being demagnetized as the temperature rises, such as a neodymium magnet, is used as the rotation shaft magnet 34, demagnetization of each magnet can be inhibited, and deterioration of the performance of the motor 20 can be prevented.

The present invention is not limited to the above embodiments, and it goes without saying that various modifications can be made without departing from the spirit of the present invention. For example, although an example in which the motor 20 is used as a drive source of the wiper device 12 having a wiping pattern of a tandem type has been described in the above embodiment, the present invention is not limited thereto and can also be used as a drive source for a wiper device having another wiping pattern such as a facing wiping type.

Also, although an example in which the motor 20 is applied to the wiper device 12 provided on the front side of the vehicle 10 in each of the above-described embodiments, the present invention is not limited thereto and can also be applied to a wiper device provided on a rear side of the vehicle 10, a railway vehicle, an aircraft, and the like. Further, here, as shown in FIG. 8, the load state monitoring unit detects the high load state on the basis of the relationship between the duty ratio and the rotation speed of the motor 20, but a method of detecting the high load state by directly detecting the drive current may be used.

In addition, materials, shapes, dimensions, numbers, locations, and the like of the components in each of the above embodiments are arbitrary as long as the present invention can be achieved, and are not limited to the above embodiments.

INDUSTRIAL APPLICABILITY

The wiper device is used for driving the wiper member to swing so as to wipe out a windshield provided in an automobile or the like and to improve a visibility of a driver or the like.

What is claimed is:

1. A wiper device which controls a duty ratio in accordance with a target rotation speed instructed by an operation of a wiper switch and causes a wiper member to perform a wiping operation using a motor, comprising: a temperature sensor which detects a temperature of the motor; a boost control unit which varies an advance angle and an energization angle associated with energization of the motor in accordance with the target rotation speed in a case in which the duty ratio has reached a predetermined upper limit value and a rotation speed of the motor is less than the target rotation speed; a first protection unit which monitors a load state of the motor and performs a first protection control for decreasing the rotational speed of the motor when a high-load state of the motor is detected; and a second protection unit which performs a second protection control for fixing the advance angle and energization angle of the motor by prohibiting an operation of the boost control unit when a first condition has been satisfied in a case in which reception of an operating signal from the wiper switch when the temperature detected by the temperature sensor exceeds a first threshold and when the first protection control is being performed is set as the first condition, wherein the second protection unit performs the second protection control when the first condition or a second condition has been satisfied in a case in which the temperature detected by the temperature sensor exceeding a second threshold higher than the first threshold is set as the second condition.

2. The wiper device according to claim 1, wherein the second protection unit releases the second protection control in a case in which the temperature detected by the temperature sensor is less than a third threshold lower than the first threshold when the second protection control is being performed.

3. The wiper device according to claim 1, wherein the second protection unit releases the second protection control in a case in which the first protection control is released when the second protection control is being performed.

4. A wiper device which controls a duty ratio in accordance with a target rotation speed instructed by an operation of a wiper switch and drives a wiper member to swing using a motor, comprising: a temperature sensor which detects a temperature of the motor; a boost control unit which varies an advance angle and an energization angle associated with energization of the motor in accordance with the target rotation speed in a case in which the duty ratio has reached a predetermined upper limit value and a rotation speed of the motor is less than the target rotation speed; a load state monitoring unit which monitors a load state of the motor; and a protection unit which fixes the advance angle and the energization angle of the motor by prohibiting an operation of the boost control unit in a case in which the temperature detected by the temperature sensor exceeds a first threshold and a high-load state of the motor is detected by the load state monitoring unit, wherein the protection unit fixes the advance angle and the energization angle of the motor by prohibiting the operation of the boost control unit when the temperature detected by the temperature sensor exceeds a second threshold higher than the first threshold.

* * * * *